June 27, 1961     A. FERRI     2,990,142
SCOOP-TYPE SUPERSONIC INLET WITH PRECOMPRESSION SURFACE
Filed May 11, 1955     5 Sheets-Sheet 1
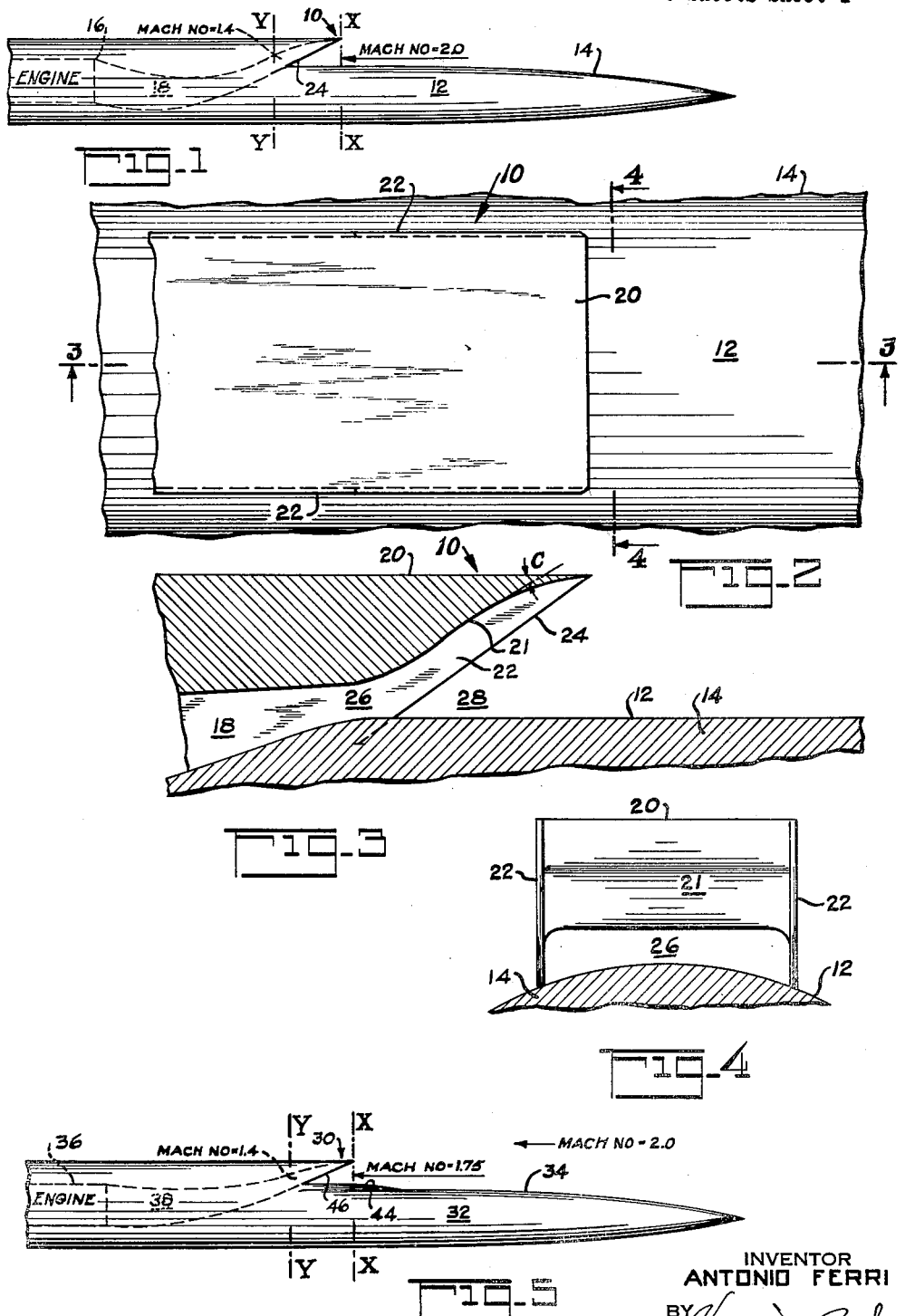
INVENTOR
ANTONIO FERRI
ATTORNEY

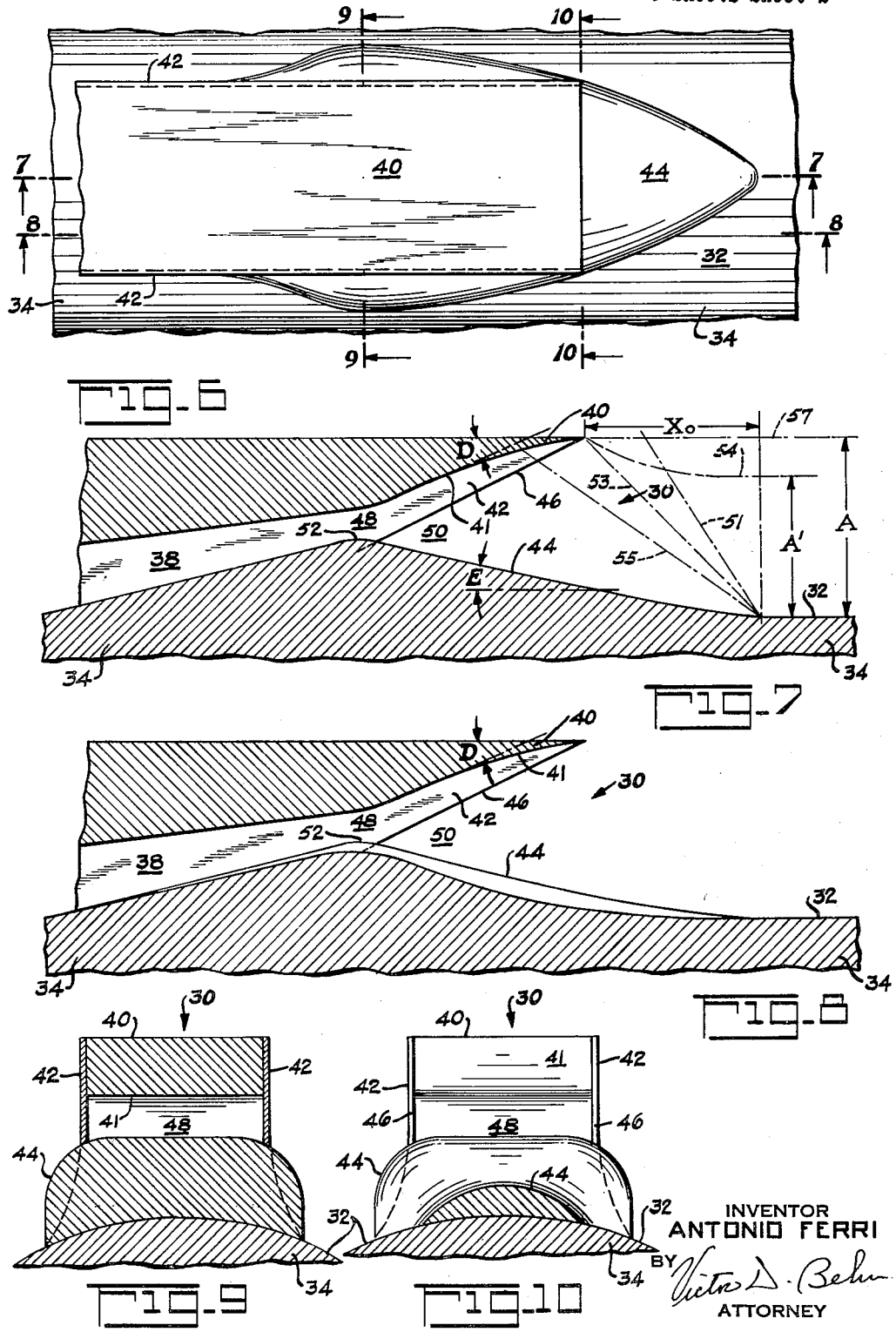

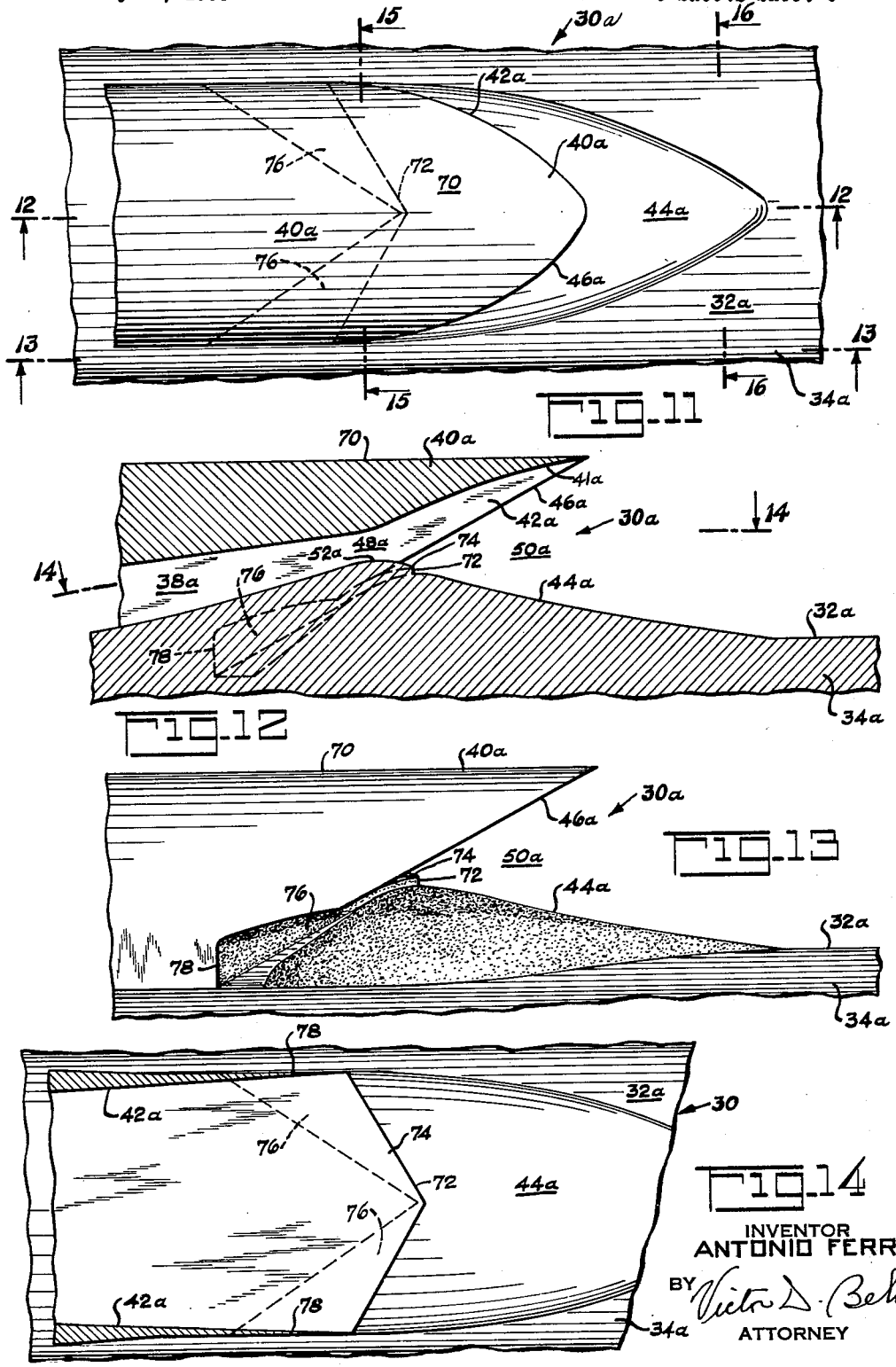

June 27, 1961 A. FERRI 2,990,142
SCOOP-TYPE SUPERSONIC INLET WITH PRECOMPRESSION SURFACE
Filed May 11, 1955 5 Sheets-Sheet 4

INVENTOR
ANTONIO FERRI
BY Victor D. Behn
ATTORNEY

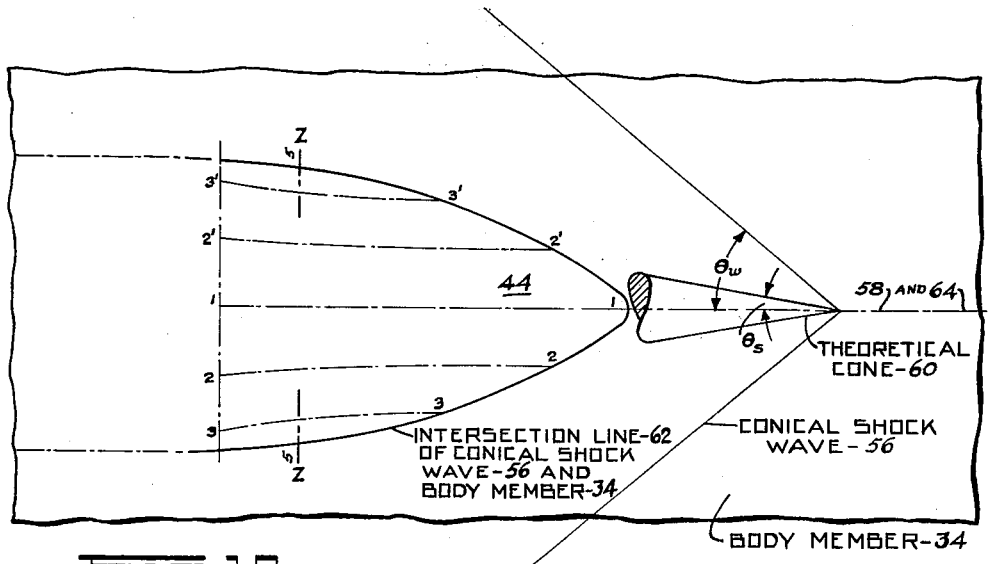
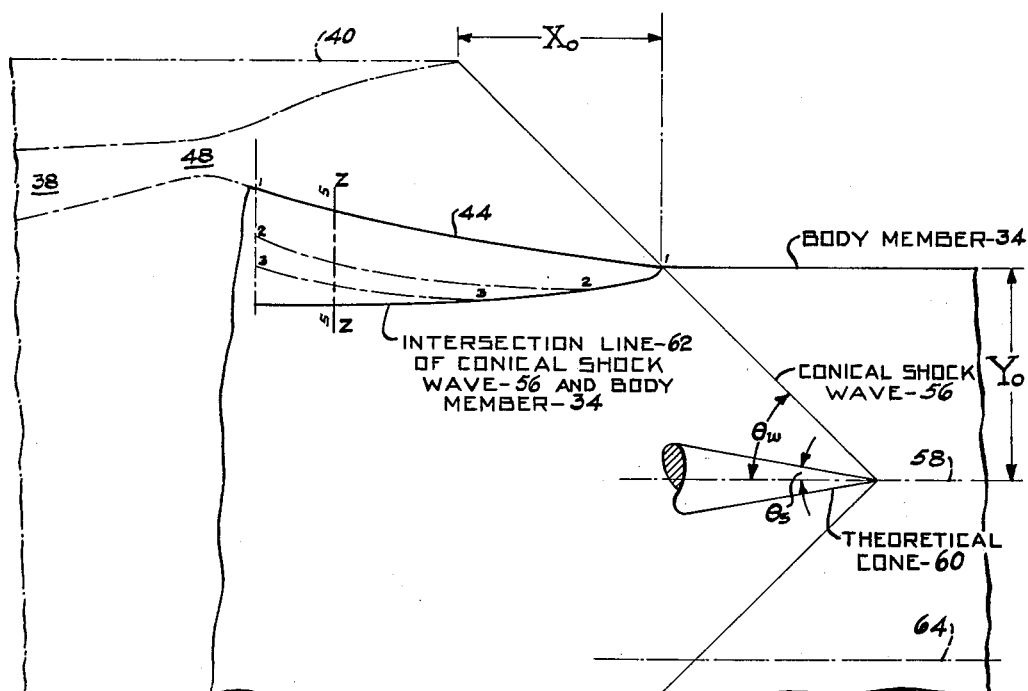

United States Patent Office 2,990,142
Patented June 27, 1961

2,990,142
SCOOP-TYPE SUPERSONIC INLET WITH
PRECOMPRESSION SURFACE
Antonio Ferri, Rockville Centre, N.Y., assignor to Curtiss-
Wright Corporation, a corporation of Delaware
Filed May 11, 1955, Ser. No. 507,649
5 Claims. (Cl. 244—53)

This invention relates to fluid inlets designed for fluids entering at supersonic velocities and is particularly directed to scoop-type air inlets for aircraft designed for high speed flight. By a "scoop-type" air inlet for an aircraft is meant an air inlet which projects laterally from an aircraft body member with the entrance opening of said inlet directed forwardly or upstream into the surrounding air flow. By high speed flight is meant any aircraft speed from high subsonic through supersonic.

Present day jet engines for aircraft (including missiles) designed for supersonic flight require air inlets operating at supersonic air velocities to supply the required free stream air mass to the engine compressor and combustion chamber. In conventional turbojet or ramjet engines, the velocity of the air entering said compressor and combustion chamber generally must be subsonic. Therefore, the velocity of the air, which is supersonic when said air enters the inlet, must be reduced to subsonic at least before the air enters the combustion chamber. At the same time, there must be maximum pressure recovery, i.e., an efficient conversion of dynamic pressure to static pressure as evidenced by a minimum loss in the total pressure of the air (where the total pressure is the sum of the dynamic and static pressures) during the transition from supersonic to subsonic flow. For maximum pressure recovery, such an air inlet is provided with a restricted or throat portion downstream of its leading edge; and, when functioning properly, the inlet air flow velocity upstream of the inlet throat will be supersonic while downstream of the inlet throat it will be subsonic. When the inlet is so functioning, it is said to have "started." Initially the air flow velocity will be subsonic throughout the inlet. For the inlet to start after sonic flight speed is exceeded, a shock region with a relatively strong shock, where the transition from supersonic flow to subsonic flow occurs, will have to move downstream into the inlet to the inlet throat section or downstream therefrom. The mass flow of air that will pass through the inlet throat in the started condition will be greater than the amount that will pass through during the starting procedure or when unstarted; therefore, in the latter two conditions part of the airstream downstream of said strong shock region must be spilled outside of the inlet. Supersonic scoop-type inlets have been provided with swept-back side plates to permit spillage of air downstream of said strong shock region during starting of the inlet.

An object of this invention is to provide a novel construction of a scoop-type supersonic air inlet for the efficient conversion of dynamic pressure to static pressure.

A further object of this invention is to provide a novel construction to facilitate starting of a scoop-type supersonic air inlet.

Increases in static pressure, or compression, in a supersonic inlet can be accomplished by the physical turning of the air which results in the generation of compressive shock waves. A further object of the invention comprises the provision of a scoop-type air inlet having a novel aerodynamic compression surface (hereinafter termed a compression bump) for more efficiently producing compression in the inlet. In accordance with the invention, the compression bump is formed on the inlet surface adjacent to the aircraft body member from which the inlet projects so that only a part of the physical turning and resulting air compression required is produced by the inlet outer wall formed by the scoop, the rest of the required physical turning and resulting air compression being effected by the bump surface. The compression bump preferably is integral with the surface of said aircraft body member and its upstream end may be disposed upstream or downstream of the leading edge of said outer wall of the inlet. With the leading edge of said bump disposed upstream of the leading edge of said inlet outer wall, the presence of the bump also provides precompression of the air before the air enters the inlet thereby reducing the Mach number of the supersonic airstream before the air enters the inlet so that less air spillage is required to start the inlet. In addition, in the case of a three-dimensional bump, the bump imparts to the air flow a pressure gradient which is normal to the direction of the entering air thereby assisting in removal of the boundary layer of air adjacent to said body member and bump.

Other objects of this invention will become apparent upon reading the annexed detailed description in connection with the drawing in which:

FIG. 1 is a schematic view of a portion of an aircraft designed for supersonic flight incorporating a prior-art scoop-type air inlet.

FIG. 2 is a plan view of a prior art scoop-type inlet without a compression bump designed for operation at a particular Mach number.

FIG. 3 is a side-sectional view of said prior art scoop-type inlet taken along line 3—3 of FIG. 2.

FIG. 4 is an end view of said prior art scoop-type inlet taken along line 4—4 of FIG. 2.

FIG. 5 is a schematic view of a portion of an aircraft designed for the same supersonic flight as the aircraft of FIG. 1 incorporating a scoop-type air inlet embodying the subject invention.

FIG. 6 is an enlarged plan view of the inlet of FIG. 5.

FIGS. 7, 8, 9 and 10 are sectional views taken along lines 7—7, 8—8, 9—9, and 10—10 respectively of FIG. 6.

FIG. 11 is a plan view similar to FIG. 6 but illustrating a modified form of the invention.

FIGS. 12, 13, 15 and 16 are sectional views taken along lines 12—12, 13—13, 15—15 and 16—16 respectively of FIG. 11.

FIG. 14 is a partial plan view taken along line 14—14 of FIG. 12.

Figure 17:
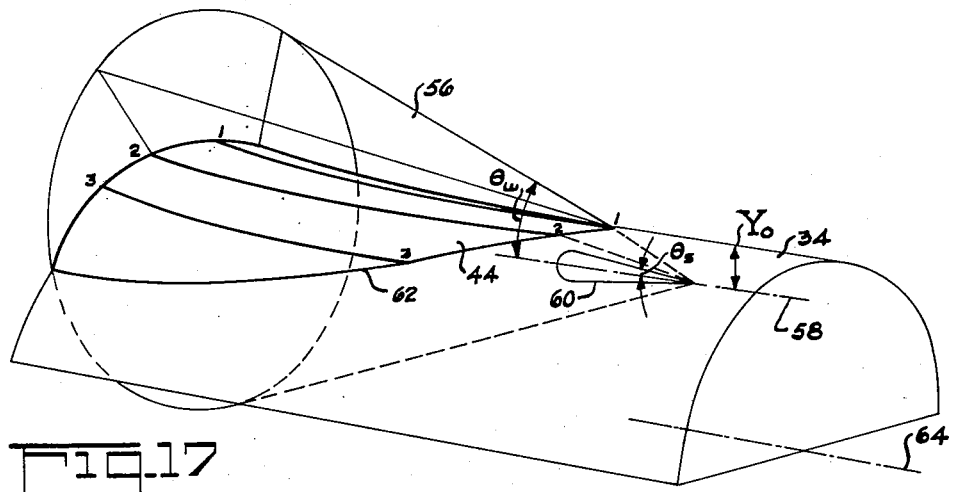

FIG. 17 is a three dimensional or isometric view showing a preferred method of constructing the compression bump.

FIG. 18 is a plan view and FIG. 19 is a side view of the isometric view shown in FIG. 17.

Figure 20:
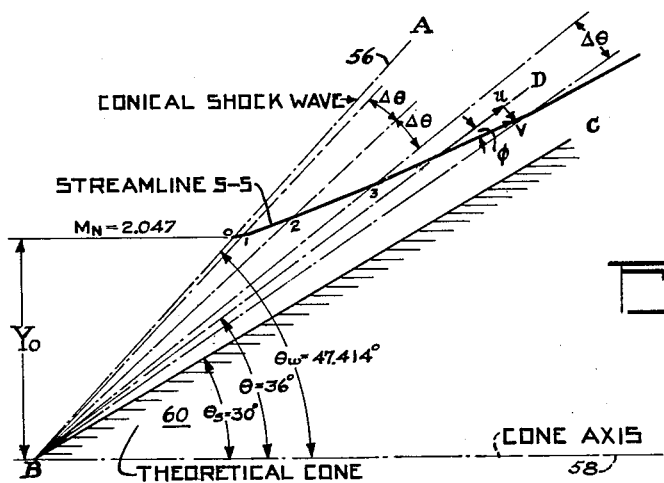

FIG. 20 illustrates the method of constructing the streamlines shown in FIGS. 17, 18 and 19.

Referring first to FIG. 1 of the drawing a conventional scoop-type air inlet 10 is illustrated as projecting laterally from the surface 12 of a body member 14 of an aircraft. An engine 16 is mounted within the aircraft body member and a duct or passage 18, the forward end of which is formed by the inlet, supplies the air entering the inlet to said engine. With this arrangement the inlet, in effect, scoops air from the approaching air stream and supplies the air inwardly into the aircraft body member to the engine 16. The details of this conventional inlet 10 are best seen in the enlarged views of FIGS. 2–4.

Referring now to FIGS. 2–4, the air inlet 10, or inlet end of the passage 18, is formed by a scoop 20 having an inner wall surface 21 and a pair of swept back side plates 22 and by the adjacent surface of the body member 14. Said inner scoop surface 21 forms the outer wall of the inlet and is contoured to provide turning of the air inwardly thereby compressing the air entering at supersonic velocities; and preferably, said inner surface has a gradual change of curvature so as to provide gradual or isentropic compression. The upstream end of said inlet outer wall 21 extends in a direction which is substantially tangent to the free stream direction of the approaching air flow and together with the outer surface of the scoop 20 provides the scoop with a sharp leading edge. Each of the side walls 22 is swept back from the leading edge of the inlet outer wall 21 along a line 24 terminating substantially at the inlet throat 26. At the designed maximum flight speed of the aircraft, the line 24 preferably substantially coincides with an oblique shock wave within the inlet extending from the leading edge of the inlet outer wall 21. This swept back construction of each side wall 22 provides a triangular-shaped opening 28 in each side wall tapering downstream and terminating substantially at the inlet throat 26.

During starting of the inlet 10 a portion of the air downstream of the strong shock wave entering the inlet spills out laterally through the side wall openings 28 to permit said shock wave to move down toward the inlet throat 26. If the spillage openings 28 are sufficiently large said shock wave will move down to or through the inlet throat whereupon the inlet is fully started. If said openings are not sufficiently large a strong shock will not move down to the throat and the inlet 10 will be unstarted. As a result, the mass flow of air flowing through the inlet throat 26 and often the total pressure recovery are less than would be the case had the inlet fully started.

When the inlet is started a strong shock is at or downstream of the inlet throat as stated above. To minimize the total pressure loss associated with compression across a strong shock, it is desirable to have relatively low supersonic air velocities immediately upstream of said shock, for example a Mach number of 1.4 or lower. If the air is entering the inlet at a higher Mach number, for example 2.0, compression of said air is required to slow it down. This compression can be accomplished by contouring one of the walls of the inlet passage so as to turn gradually the adjacent air flow into the column of air entering the inlet. By a gradual turning of the air in this manner, the resulting compression will be substantially isentropic. In the inlet 10 all of this isentropic compression will be produced by the turning effect of the inlet outer wall 21. The higher the maximum entering Mach number for which the inlet is designed, the greater will be the turning or isentropic compression of the air required. Hence in the case of an inlet 10 designed for flight speeds of high Mach number, the inlet outer wall 21 will have a large degree of turning. The increasing pressure gradient and large degree of turning result in the growth of a thick boundary layer along the compression surface. This thick boundary layer is susceptible to flow separation causing choking of the inlet. Choking of the inlet flow will produce adverse effects on the downstream flow such as a decrease in total pressure recovery, a decrease in the mass flow of air and a non-uniform velocity distribution at the engine face.

In accordance with the present invention, a second compression surface is incorporated in a scoop-type inlet on the wall of the inlet adjacent to the aircraft body member in such a manner that the amount of turning of the inlet air required for compression at supersonic velocities is divided between this surface and an inlet outer wall compression surface. In addition, the second compression surface is disposed so that the required amount of spillage air for starting is reduced.

FIG. 5 illustrates a scoop-type inlet 30 embodying the invention with the inlet projecting laterally from the surface 32 of a body member 34 of an aircraft. An engine 36 is mounted within the aircraft body member 34 and a duct or passage 38, the forward end of which is formed by the inlet, supplies the air entering the inlet to said engine. Except for the details of the inlet and the passage 38, the structure of FIG. 5 has been illustrated as identical with that of FIG. 1 so that some of the advantages of the invention can be more readily understood. The details of the inlet 30 are best seen in FIGS. 6–10.

Referring particularly to FIGS. 6–10, the air inlet 30 is formed by a scoop structure 40 projecting laterally from the aircraft body member 34 to form a forwardly directed air inlet passage therebetween. The scoop structure has an inner compression surface 41 forming the outer wall of the air inlet and has a pair of swept back side walls 42 forming side walls of said inlet. The inner wall of the inlet is formed by a bump-like compression surface 44 on the aircraft body member opposite to said inlet outer wall 41. Like the inlet outer wall 21 of the inlet 10, the inlet outer wall 41 is contoured to provide a gradual or isentropic compression surface but with less turning of the air. Thus the upstream end of the inlet outer wall 41 extends in a direction which is substantially tangent to the free stream direction of the approaching air and together with the outer surface of the scoop 40 preferably provides said scoop with a sharp leading edge. Also, like the side walls of the inlet 10, each of the scoop side walls 42 is swept back from the leading edge of the inlet outer wall 41 along a line 46 terminating substantially at the inlet throat 48. At the design maximum flight speed of the aircraft, the line 46 preferably substantially coincides with the oblique shock wave within the inlet extending from the leading edge of the inlet outer wall 41. As in the conventional scoop inlet 10 of FIGS. 2–4, the swept back construction of each side wall 42 provides a triangular shaped opening 50 in said side wall with said opening tapering downstream and terminating substantially at the inlet throat.

The compression surface 44 is in the form of a bump which projects from the adjacent surface 32 of the aircraft body member 34. As illustrated, this bump begins at a point upstream of the leading edge of the inlet outer wall 41 and extends downstream to form a crest portion 52 substantially in the region of the inlet throat 48. The upstream portion of the bump surface gradually turns toward the free stream direction of the approaching air. Downstream of the inlet throat 48 the contour of the bump conforms to the shape of the passage 38 communicating with the engine 36, this passage curving into the aircraft body member 34 downstream of said inlet throat.

A compression bump such as bump 44 of FIGS. 5–10 may be constructed by assuming that a shock wave intersects the body member 34 on which the bump is to be located. The contour of the bump is then determined by the stream surface defined by those streamlines beginning along the line of intersection 62 of the shock wave and body member. In assuming the shock wave which intersects the body member, the values of several factors must be chosen from practical considerations. First, the amount of compression to be produced by the bump and that portion to be produced by the initial shock wave generated by the bump (which coincides with the assumed shock wave) at a selected free stream Mach number must be chosen. The angle of the initial shock (and therefore of the assumed shock) relative to the free stream direction may be calculated knowing the free stream Mach number and the desired pressure rise across the shock. The type of flow field produced by the bump is also selected from practical considerations. For example, an axially symmetric conical flow field may be chosen. In addition, the relative position of the axis of the shock wave and the body member surface must be selected since this dimension $Y_o$ (FIGS. 7, 17, 19 and 20) determines the width of the bump and hence the spillage and drag of the inlet.

Another factor to be considered in the design of the bump 44 is its axial position relative to the inlet outer wall 41. As illustrated, the leading edge of the bump 44 is disposed a distance upstream of the leading edge of the inlet outer wall 41, this distance being indicated as $X_o$ in FIG 7. With this construction, at a particular relatively low supersonic flight speed, the initial conical shock off the bump 44 may, as indicated by the line 51 (FIG. 7), pass upstream of the inlet outer wall 41 so as not to intersect this wall. At this flight speed, the line 54 represents the outer stream line of the air entering the inlet whereby at this condition A' (FIG. 7) may be taken as a measure of the inlet capture area, that is of the free stream area of the stream tube of air entering the inlet. At a higher flight speed the line 53 represents said initial shock which, as illustrated, intersects the leading edge of the inlet outer wall 41. The line 55 represents said initial shock at still higher flight speeds and therefore said shock intersects the inlet outer wall downstream of the leading edge of said wall. At the flight speed resulting in the initial shock 53, if the envelope of said shock matched the outline of the inlet then the line 57 would represent the outer stream line of the air entering the inlet and A (FIG. 7) would be a measure of inlet capture area. Actually, in the inlet structure of FIGS. 6–10, the conical shock off the bump 44 doesn't match the outline of the scoop outer wall so that with the condition of shock 53 some air spills beyond the sides of the inlet. It is clear from FIG. 7, however, that with increase in the flight speed, for example from a condition resulting in the shock 51, the inlet capture area increases. It is also clear from FIG. 7 that the actual capture area of the inlet at any particular flight speed will depend on the position of the bump, that is, on the distance $X_o$. The air mass flow requirements of the engine also increase with increasing Mach number of the flight speed. The distance $X_o$ is selected so that the inlet capture area variation with Mach number is such that the variation with Mach number of the mass air flow entering the inlet at least approximates the variation with Mach number of the air mass flow requirements of the engine.

If the assumed shock wave is to have a circular conical shape then the velocity, pressure, density, and temperature of the air at any point in said flow field downstream of said wave may be determined from published tables, for example, the "Tables of Supersonic Flow Around Cones" prepared by the staff of the Computing Section, Center of Analysis (under the direction of Zdenek Kopal), Technical Report No. 1. M.I.T., 1947 hereinafter referred to as the M.I.T. tables. These tables are presented in terms of $\theta s$ the semi-apex angle of a solid cone which when moving through the air at supersonic speed produces a conical shock wave. For a given free stream Mach number a particular solid cone will produce a particular conical shock wave having the semi-cone angle $\theta w$. Therefore, since the tables are presented in terms of $\theta s$, the semi-apex angle of the solid cone, said angle will be used below in the description of one particular method of constructing the stream lines defining the bump.

Referring now specifically to FIGS. 17–20 of the drawing, there is shown the construction of the bump 44 using an axially symmetric conical shock wave 56 with the axis 58 of said conical shock 56 parallel to the axis 64 of the aircraft body member 34. Assume that the inlet is desired to operate at a design Mach number of 2.047 and that the pressure rise ratio across the initial conical shock shall be about 2.4. From Part VIII of the M.I.T. tables, page 551, a $\theta s=30°$ and a $\theta w=47.414°$ can be determined. The shock wave 56 and the theoretical cone 60 have the common axis 58. The conical shock wave 56 intersects the body member 34 on which the bump 44 is to be located along the line of intersection 62. The axis 64 of the body member (represented as a cylinder) is parallel to the axis 58. The bump contour is defined by the streamlines within the conical flow field such as 1—1, 2—2, and 3—3 beginning along the intersection line 62, each such streamline lying in a plane which includes the axis 58 and the initial point of said streamline on the line 62. The dimension $Y_o$ is shown in FIGS. 17, 19 and 20; the dimension $X_o$ can be seen in FIG. 19.

The shape of each streamline can be approximated using Part I of the M.I.T. tables. FIG. 20 illustrates one method of approximating a streamline 5—5 using these tables. For the selected Mach number 2.047 and $\theta s=30°$, $\theta w=47.414$ the data for the radial and tangential velocities at any point in the resulting conical flow field can be found on page 398 of tables. The angle ABC ($\theta w-\theta s$) is divided into a number of sectors. $\Delta \theta$ and the direction of the streamline across each sector is taken as constant and the same as the direction of the air at the bisector of said sector. It is apparent therefore that the larger the number of sectors into which the angle ABC is divided the more closely does the streamline so determined approximate the actual streamline. Each bisecting line and the cone axis 58 define an angle $\theta$. For a given value of $\theta$ an associated value for $u$, the air velocity along the bisector BD, and $v$, the air velocity normal to said bisector BD, can be determined from the M.I.T. tables. Thus, referring again to page 398, for a $\theta$ of 36° $u$ is .49478 and $v$ is —.09752. The tangent of $$\frac{v}{u}$$

is the angle $\phi$ which is the direction of the streamline relative to the bisecting line. In the example above and as seen on FIG. 20 $\phi=11.17°$. The direction determined by this angle is taken as the constant direction across the sector. The direction of the streamline 5—5 across each of the other sectors can be similarly determined. Then, starting at the intersection line 62 (point 0 in FIG. 20), the entire streamline 5—5 can be drawn as illustrated from point 0 to point 1 to point 2 etc. With a bump constructed in this manner, the upstream end of the bump makes a small angle with the free stream direction of the approaching air to produce the conical shock 56 and the surface of the upstream portion of the bump corresponds to the surface defined by the air streamlines starting at the upstream edge of the bump at the design Mach number of the inlet.

As stated above the compression bump does not necessarily need to be developed from the streamlines in a conical flow field. For high free stream Mach numbers (say 2.5 or higher) more efficient compression is produced by a bump which generates a relatively weak initial shock followed by a gradually increasing compression in place of a stronger shock followed by a conical flow field. Such a bump may be defined by the streamlines in a flow field about an axially symmetric body having a spike-type or concave contour (similar to a conventional isentropic spike) rather than by the streamlines in a flow field about a circular cone. With a bump so constructed using a flow field similar to that produced by such an isentropic spike rather than by a circular cone, the initial shock off the bump is relatively weak so that the upstream end of the bump makes an even smaller angle with the free stream direction of the approaching air as compared with the corresponding angle made by a bump constructed as described in connection with FIGS. 17–20. The flow field around a body having an isentropic spike-type contour can be analyzed with known methods. The same practical considerations are taken into account and the same type of approximations may be made as in the case of the conical flow field procedures.

In addition, the shape of the bump could be defined by the streamlines in a conical flow field about a non-axially symmetric body. Data for such a flow field is given for example in PIBAL Report No. 220, Tabulated Values of Linearized Conical Flow Solutions for Solution of Supersonic Conical Flows Without Axial Symmetry by Ness and Kaplita, Polytechnic Institute of Brooklyn, January 1954. A bump obtained by this method may result in better matching of inlet captured mass flow and engine required mass flow at varying Mach numbers. For example, if the variation of engine mass flow required at different Mach numbers is smaller than the corresponding variation of inlet captured mass flow produced by a bump based on the flow about an axially symmetric body (as described above), then a bump produced by the flow about a non-axially symmetric body could be used so that the variation in engine mass flow required may be more closely matched. In addition if a smaller or a larger transverse pressure gradient is desired, the non-axially symmetric method could be used. Finally, these and other procedures of analysis can be found for example in Elements of Aerodynamics of Supersonic Flows, page 236 and following by A. Ferri; Macmillan Company, New York, 1949.

FIGS. 11-16 illustrate another modification of a scoop-type inlet incorporating the three-dimensional compression bump. Portions of the inlet shown in FIGS. 11-16 similar to those shown in FIGS. 6-10 or serving the same function, have been designated by the same numeral except that the subscript "a" has been added. In FIGS. 11-16 reference number 30a designates a scoop-type inlet incorporating a precompression bump 44a formed on the aircraft body member 34a. Because of the semi-cylindrical shape of the outer surface 70 of the inlet scoop 40a, as hereinafter described, the inlet 30a has been termed a half-round inlet. The contour of the bump 44a can be determined in a manner similar to the contour of the bump 44 as described in connection with FIGS. 17-20. The inner surface of the inlet scoop 40a, opposite the bump 44a, is curved as illustrated to form an outer portion 41a and side portions 42a forming the outer wall and side wall portions of the inlet. The inner wall portion of the inlet is formed by the surface of the bump 44a.

Figures 15, 16:
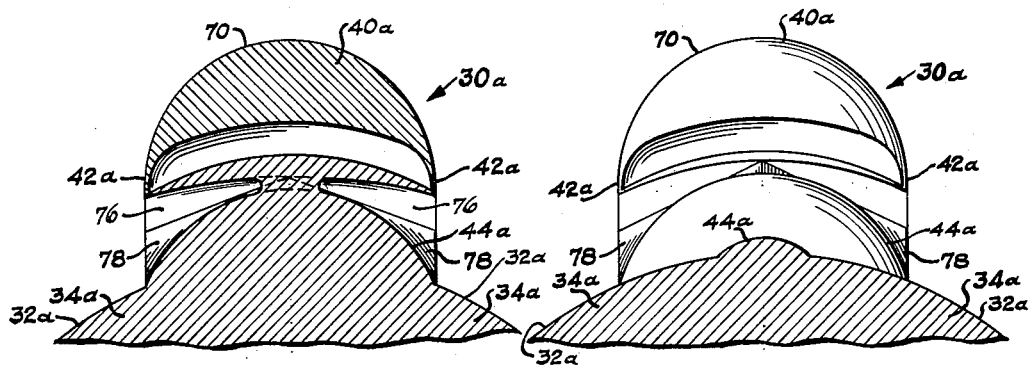

The inlet outer wall portion 41a is contoured to provide a gradual or isentropic compression surface for the entering air. The side wall portions 42a, of the inlet 30a are each swept back from the leading edge of the outer wall portion 41a along a line 46a terminating substantially at the throat 48a of the inlet. The outer surface 70 of the scoop 40a is semi-cylindrical with its axis parallel to the free stream direction. The lines 46a are formed by the intersection of a plane with said semi-cylindrical outer surface 70, said plane being inclined to the axis of said semi-cylindrical surface 70 so that said plane extends downstream toward said axis from the leading edge of said inlet outer wall portion 41a. The semi-cylindrical outer surface 70 of the inlet scoop 40a is best seen in FIGS. 15 and 16.

The leading edge of the compression surface 41a extends in an upstream direction substantially tangent to the free stream direction of the approaching air whereby said surface and the scoop outer surface 70 provide the scoop 40a with a sharp leading edge. Also, like the bump 44, the upstream end of the bump 44a preferably makes a small angle with the free stream direction of the approaching air to produce the desired shock off its leading edge.

A boundary layer scoop 72 may also be incorporated in the inlet 30a. A similar scoop could also be incorporated in the inlet 30 of FIGS. 5-10. The scoop 72 comprises a knife-like leading edge 74 and said scoop also forms the crest portion 52a of the compression bump 44a. The knife edge 74 is disposed so as to form a substantially smooth continuation of the upstream portion of the bump 44a and said knife edge 74 and the upstream portion of the bump 44a cooperate to form diverting passages 76. The ends 78 of the passages 76 are disposed outside of the side portions 42a of the inlet wall and are in communication with the surrounding atmosphere. In this way the boundary layer of air formed on the body member 34a and bump 44a upstream of the inlet throat 48a may be removed before said boundary layer reaches said inlet throat.

Some of the advantages of incorporating a compression bump in a supersonic scoop-type inlet are evident from a comparison of FIGS. 1 and 5. As shown in FIG. 1 of the drawing, if a free stream Mach number of 2.0 is assumed, then with the conventional scoop-type inlet (inlet 10) the Mach number substantially at the face of said inlet, station X—X, will also be 2.0. The Mach number immediately upstream of the normal shock, will be about 1.4 as stated previously. In order for the inlet to start, that is for the strong shock to move downstream of the throat section 26 to station Y—Y, a quantity of air must be spilled through the triangular side openings 28 (FIG. 3). Once the inlet has started, the static pressure rise or compression upstream of the normal shock must be effected by the turning of the isentropic compression surface of the scoop outer wall 20 shown in FIG. 3 by the turn angle C. In FIG. 5, incorporating the subject invention, the free stream Mach number is again assumed to be 2.0. However, because of the compression effected by the initial oblique shock wave generated by the compression bump 44, the Mach number at station X—X downstream of said initial shock is something less than 2.0, for example 1.75. The Mach number immediately upstream of the normal shock is again about 1.4. However, it should be pointed out that the lower the Mach number entering the inlet (station X—X), for a given isentropic compression, the lower will be the Mach number immediately upstream of said normal shock. At higher free stream Mach numbers than the 2.0 assumed here, the difference between inlets 10 and 30 with respect to the Mach numbers at stations X—X and also the Mach numbers immediately upstream of the normal shock regions will be appreciably increased. Furthermore, in order to start, the quantity of air which must be spilled through the triangular side openings 50 (FIG. 7) will be less than the air which must be spilled through the side openings 28 (FIG. 3). Consequently, the side openings 50 need not be as large as the side openings 28; and therefore, the inlet 30 will not have to project laterally outwardly from the aircraft body member surface 32 as far as the inlet 10 projects laterally outwardly from the surface 12. In FIGS. 1 and 5 the inlets 10 and 30 have been shown projecting laterally outwardly from their respective aircraft body members substantially the same distance in order to keep the two configurations as nearly alike as possible while showing the added feature of the compression bump. When the inlet 30 has started, the static pressure rise or compression is effected partly by the isentropic compression surface of the bump and partly by the isentropic compression surface of the inlet outer wall 41. Consequently, the rate of pressure rise per unit axial distance along the bump 44 and along its associated inlet outer wall 41 of FIG. 7 will be less than that along the inlet outer wall 21 of FIG. 3; and therefore, neither the turning by the compression surface of the outer wall 41 (angle D), nor the turning by the compression surface of the bump 44 (angle E) in FIG. 7 need be as severe as the required turning by the compression surface of the inlet outer wall 21 of FIG. 3 (angle C). Since this turning radially inwardly of said compression surface of the inlet outer wall 21 is more severe as is the reverse turning of the passage 18 in FIG. 1, there is a greater possibility that separation of air from the scoop compression surface will occur in the conventional inlet 10 thereby increasing the possibility of a choked condition occurring in the subsonic portion of the passage 18. Because the scoop type inlet 30 embodies the subject invention, the turning and reverse turning of the inlet passage 38 is more gradual as shown in FIG. 5 than the turning of the passage 18 shown in FIG. 1, and therefore, there will be less likelihood of separation of the air and subsequent choking of the subsonic portion of the passage 38 occurring.

An advantage of incorporating a three-dimensional compression bump such as 44 or 44a in a supersonic scoop-type inlet is that such a three-dimensional bump will provide efficient removal of the boundary layer of air formed upstream of the inlet on the body member 34 or 34a and on the bump itself. A right circular cone (as cone 60) theoretically produces a flow field having a constant cross flow pressure gradient away from the bump centerline, for example line 1—7 in FIG. 18. Consequently a scoop-type inlet incorporating a three-dimensional compression bump such as described, will have an advantage over a scoop-type inlet having a two dimensional ramp-type bump and obviously over a conventional scoop-type inlet having no bump in that the three-dimensional bump will create a pressure gradient which will sweep the boundary layer flowing along the aircraft body member and the bump laterally in both side directions. Since the static pressure increases in an axial direction downstream of the conical shock 56 it can be seen in FIGS. 18 and 19 that at any particular axial station Z—Z downstream of the initial portion of the bump the static pressure of the air flowing along streamline 1—1 will be greater than the static pressure of the air following the streamline 2—2 etc. In addition, at station Z—Z the static pressure along 2—2 will be substantially the same as the static pressure on 2'—2', the static pressure on 3—3 will be the same as the static pressure on 3'—3' etc. Therefore, air flowing over the left portion of the bump (i.e. to the left of streamline 1—1) as viewed in a downstream direction in FIG. 18 will be turned outwardly towards the left side of the bump; and in the same manner, air flowing over the right portion of the bump will be turned outwardly towards the right side of the bump as the diverging streamlines so indicate. The resultant effect will be one of sweeping the boundary layer aside so that it does not enter the inlet proper. In starting, the cross-flow pressure gradient created by the bump will cause air to be spilled outside the inlet upstream of the triangular shaped side openings therefore requiring less air to be spilled through these openings.

Another advantage of the three-dimensional bump over a two-dimensional ramp-type bump is that the three-dimensional bump may be more readily "skewed" relative to the axis of the aircraft body member 34. A "skewed" three-dimensional bump may be designed by "skewing" the axis 58 of the cone 60 relative to the axis 64 of the aircraft body member. The resulting "skewed" bump will still blend smoothly with the body member 34 while a "skewed" two-dimensional bump would have sharp protuberances extending out from the surface 32 of the aircraft body member 34. A "skewed" bump is desirable where the free stream air does not flow parallel to the portion of the surface 32 of the aircraft body member 34 upstream of the inlet, a condition very frequently encountered.

Finally, it should be pointed out, that the half-round inlet 30a is preferred to the rectangular inlet 30 because the area encompassed by the scoop inlet wall portions 41a and 42a can be more readily matched to the shock wave generated by a three-dimensional compression bump than can be the area encompassed by the inlet outer wall 41 and side walls 42 of the rectangular inlet 30 with the result that, after starting there will be less spillage of air around the half-round inlet than around the rectangular inlet. However, even with the rectangular inlet 30 this spillage is small.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:
1. In an aircraft designed for high speed flight having a body member having an external surface whereof at least a portion is generally cylindrical, said body member having a longitudinal axis parallel with the direction of the principal airstream and a first transverse axis perpendicular to said longitudinal axis and a second transverse axis perpendicular to both said longitudinal and first transverse axes, the combination with said body member of a protruding precompression bump formation disposed on said generally cylindrical surface of said body member, said bump formation having a leading end disposed toward the upstream end of said body member, said leading end having a convex outline of high curvature as projected in a direction parallel with said first transverse axis, said bump formation having mutually diverging side edges intersecting said generally cylindrical surface and continuous with said leading end and extending in a generally downstream direction therefrom, said side edges having a convex curvature of lesser degree than said leading end, said bump formation having an external surface substantially faired into said generally cylindrical surface at said leading end and extending progressively further from said cylindrical surface downstream from said leading end and having a crest downstream from said leading end, said bump formation being of convex curvature on the surface thereof in any plane parallel with said first and second transverse axes and downstream from said leading end, and a scoop member extending from said body member and partially enclosing said bump formation and spaced therefrom in the direction of said first transverse axis and positioned downstream from said leading end, said scoop member having a continuous wall having an open end in the direction toward said leading end and closed elsewhere, said scoop member defining with said body member and said bump formation an air inlet passage for said aircraft, said scoop member having an inner surface curving from said open end toward said bump formation and defining with said crest a throat section in said air inlet passage.

2. The combination recited in claim 1 in which the inner surface of said scoop member is substantially tangential to said principal air-stream at said open end of said scoop member.

3. The combination recited in claim 2 in which said open end of said scoop member has a sharp edge.

4. The combination recited in claim 2 in which said body member has a passage forming a downstream continuation of said air inlet passage and curving into said body member from said throat section.

5. The combination recited in claim 2 in which said open end of said scoop member has substantially the form of a convex arc in projection in a direction parallel with said longitudinal axis, and in which the ends of said arc intersect said body member downstream from the center portion of said arc and substantially adjacent to said throat section.

References Cited in the file of this patent
UNITED STATES PATENTS

| | | |
|---|---|---|
| 2,352,790 | Jordan | July 4, 1944 |
| 2,480,036 | Lloyd et al. | Aug. 23, 1949 |
| 2,503,973 | Smith | Apr. 11, 1950 |
| 2,573,834 | Davidson | Nov. 6, 1951 |
| 2,596,435 | Robert | May 13, 1952 |
| 2,631,425 | Nordfors | Mar. 17, 1953 |
| 2,649,266 | Darrieus | Aug. 18, 1953 |